(12) United States Patent
Pietrzyk

(10) Patent No.: US 7,787,990 B2
(45) Date of Patent: Aug. 31, 2010

(54) SYSTEM OF THREE-DIMENSIONAL MULTIPURPOSE ELEMENTS AND THE METHOD FOR CREATING THREE-DIMENSIONAL MULTIPURPOSE ELEMENTS

(76) Inventor: Andrzej Pietrzyk, Os. Bohaterow Wrzesnia 32/95, Krakow (PL) PL-31-926

( * ) Notice: Subject to any disclaimer, the term of this patent is extended or adjusted under 35 U.S.C. 154(b) by 1133 days.

(21) Appl. No.: 10/540,587

(22) PCT Filed: Nov. 12, 2003

(86) PCT No.: PCT/PL03/00117

§ 371 (c)(1),
(2), (4) Date: Jun. 25, 2005

(87) PCT Pub. No.: WO2004/062759

PCT Pub. Date: Jul. 29, 2004

(65) Prior Publication Data

US 2006/0155388 A1    Jul. 13, 2006

(30) Foreign Application Priority Data

Jan. 15, 2003    (PL) ..................................... 358286

(51) Int. Cl.
*G06F 19/00* (2006.01)
(52) U.S. Cl. ................ 700/245; 977/724; 977/725; 977/882; 446/85; 446/129
(58) Field of Classification Search ................ 700/245; 977/724, 725, 882
See application file for complete search history.

(56) References Cited

U.S. PATENT DOCUMENTS

| 4,608,525 | A | 8/1986 | Mori |
| 5,210,821 | A * | 5/1993 | Yazaki et al. ............... 700/248 |
| 5,361,186 | A * | 11/1994 | Tanie et al. .................. 361/191 |
| 5,452,199 | A * | 9/1995 | Murata .......................... 700/2 |
| 6,157,872 | A | 12/2000 | Michael |
| 6,233,502 | B1 * | 5/2001 | Yim .......................... 700/245 |
| 6,459,957 | B1 * | 10/2002 | Bennett et al. .............. 700/245 |

(Continued)

OTHER PUBLICATIONS

Yoshida et al., 2002; A Self-Reconfigurabel Modular Robot: Reconfiguation Planning and Experiments; International Journal of Robotics Research; vol. 21, pp. 903-915.*

(Continued)

*Primary Examiner*—Khoi Tran
*Assistant Examiner*—Nikhil Sriraman
(74) *Attorney, Agent, or Firm*—Galbreath Law Offices, P.C.; John A. Galbreath

(57) ABSTRACT

A system of three-dimensional multipurpose elements is disclosed, consisting of single solid elements which can be computer-controlled to move, connect to one another, and disconnect from one another. A single element of the system consists of a casing made up of walls (6), linked with each other by means of an electroplastic actuator (3) which changes the reciprocal position of the walls of the casing of a single element. Changes in the reciprocal position of the walls occur according to the exciting signal transmitted from a programmable integrated circuit (1). Heat emitters (14) carry away excess heat from the system devices. Inside a single element there are provided interlocks (7) for connecting respective single elements, as well as magnetic coils (8) and a voltage source (5) supplying the integrated circuit (1), interlocks, magnetic coils and electroplastic actuator.

10 Claims, 7 Drawing Sheets

U.S. PATENT DOCUMENTS

| | | | |
|---|---|---|---|
| 6,477,444 B1* | 11/2002 | Bennett et al. | 700/245 |
| 6,487,454 B1* | 11/2002 | Tymes | 700/2 |
| 6,510,359 B1* | 1/2003 | Merkle et al. | 700/121 |
| 6,636,781 B1* | 10/2003 | Shen et al. | 700/248 |
| 6,725,128 B2* | 4/2004 | Hogg et al. | 700/245 |
| 6,842,246 B2* | 1/2005 | Roufas et al. | 356/399 |
| 2002/0115373 A1* | 8/2002 | Lazerman | 446/85 |
| 2005/0118925 A1* | 6/2005 | Kretzschmar | 446/124 |

OTHER PUBLICATIONS

Murata S et al, "Self-assembling machine", Robotics and Automation, 1994 Proceedings, 1994 IEEE International Conference, May 8-13, 1994.

Solem J C, "Self-assembling micrites based on the platonic solids", Robotics and Autonomous Systems, Elsevier Science Publishers, vol. 38, pp. 69-92, 2002.

Hosakawa et al, "Self-organizing collective robots with morphogenesis in a vertical plane", Proceedings, 1998 IEEE International Conference, May 16-20, 1998.

* cited by examiner

SYSTEM OF THREE-DIMENSIONAL MULTIPURPOSE ELEMENTS AND THE METHOD FOR CREATING THREE-DIMENSIONAL MULTIPURPOSE ELEMENTS

CROSS-REFERENCES TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

1) Field of the Invention

The subject of the invention is a system of three-dimensional multipurpose elements and the method for creating three-dimensional Multipurpose Elements used for creating three-dimensional constructions, having a vast range of forms, colours and materials, mechanical, kinematics and functional properties, by making use of autonomously independent solid elements. According to the invention, the system of three-dimensional multipurpose elements may be applied in making functional copies of an original object in various technologies, for example in space technologies, furniture industry, decorative and building industry, toy-making and entertainment industry, orthopaedics, three-dimensional mobile telephony, the manufacturing of industrial, rescue and household robots, and finally, for generating research simulation systems, especially in genetics, crystallography and chemistry.

2) Description of Related Art

The description of International patent application PCT/GB95/00460 (publication no. WO 95/23676) reveals some programmable materials constituting a set of hexagonal bricks, named monomers, which can move towards each other in a computer-controlled mode and create structures and mechanisms. Monomers can both combine with other monomers and move towards each other unseparated. In case a monomer is damaged, those still in existence eliminate it and replace with a good clone.

The motion of monomers is systematically split into streams, gates, trunk lines and containers for designating individual paths of motion of respective monomers necessary in the synthesis of the entire structure. Specialised monomers are provided with tools, which form the intended devices together with the intended and synthesised structure. Monomers have grooves in the vertical symmetry axes of the sidewalls; instead, inside monomers there are protrusive interlocks provided with sliding wedges. Neighbouring monomers may be combined and blocked with each other or linked in such a way that their reciprocal translocations upon connecting are possible through a toothed bar and a toothed wheel [s] or otherwise. Respective monomers may be positioned with each other through a system of latches controlled either with an electromagnet or a linear induction motor.

The second monomer form is provided with four symmetrical grooves on each wall, the grooves being positioned at an angle of 45° to the wall symmetry axis. Those grooves serve for inserting elements, which block the mutual connection of neighbouring monomers.

The third monomer form is provided with frontal elements on all six walls, the elements being supplied with tee section grooves placed in the symmetry axes of the elements. In the grooves are placed latch units, which allow aligning the reciprocal position of the monomers being linked. The latch units are controlled by gear transmissions arranged vertically to the external surface of the frontal elements of monomer. Linear induction motors with electromagnets secure the transport of monomers. The linear induction motors of stationary monomers translate the monomers, which are to be transported. A precise co-ordination of linear induction motors of the series of stationary monomers allows attaining a high transport velocity along that series. Electricity is supplied and the transmission of the controlling data occurs from the central source through neighbouring monomers.

The paper entitled "3-D Self-Assembling and Actuation of Electrostatic Microstructures" published in the "IEEE TRANSACTION ON ELECTRON DEVICES" VOL. 48, NO 8, AUGUST 2001 reveals a three-dimensional self-assembling and starting electrostatic microstructure. The purpose of the microstructure is completion of the dedicated controlling elements for optical applications, and especially, for micro-mirror matrices with large angles of reflection. The initial flat structure is performed inside one polysilicon structural layer. The mobile structure contains a rotating plate connected with two principal supporting beams through thin elastic props. Combinations of four integrated final control units SDA determine the supporting beams. Through a pulsating electric signal, SDA elements move and eventually bend the initially flat structural layer. Once the required shape of the structure is reached, the respective elements are mechanically blocked.

In addition, the publication, "Self-Assembling Machine" (PROCEEDINGS OF THE INTERNATIONAL CONFERENCE ON ROBOTICS AND AUTOMATION, San Diego, MAY 8-13, 1994, LOS ALAMITOS, IEEE COMP. SOC. PRESS, US) reveals a self-assembling device consisting of identical elements completing a two-dimensional machine. Each element is made up of three layers and has no mobile parts. The top and bottom layers have identical shapes and each contains three magnets arranged symmetrically, while their magnetic north pole is placed on the bottom layer. The middle layer has the same shape as the top and bottom ones, but is turned at an angle of 60° towards them and contains three electromagnets in lieu of magnets. The electromagnets have the magnets retracted or pushed out according to the polarisation of the voltage applied and may rotate between two magnets without any effect on the magnetic field. Each element may be linked to no more than 6 other elements. The communication between respective elements is secured due to an infrared optical system. The relays and receivers are arranged in the holes in the middle of the magnets and electromagnets. The communication occurs via an asynchronous series protocol. An 8-bit processor is used to decide on the polarisation of the electromagnets in compliance with the information received. Electricity is provided in a wireless system where the plate on which the elements are arranged is used as supply terminal. The plate is divided into zones and every other one of them is connected to the supply voltage, whereas the remaining ones are grounded. In other words, the zones alternate between a zone that is connected to the supply voltage, then a zone that is grounded, then a zone that is connected to the supply voltage, then a zone that is grounded, and so on. The elements are fed from four contacts and a rectifier. Respective elements have only information on local connections with the neighbouring elements. The shape of the entire structure is based upon local links between respective elements.

BRIEF SUMMARY OF THE INVENTION

The invention is a system of three-dimensional multipurpose elements, consisting of single solid elements which can be computer-controlled to move, connect one to and disconnect one from another. A single element of the system consists of a casing made up of walls, linked with each other by means of an electroplastic actuator which changes the reciprocal position of the walls of the casing of a single element. Changes in the reciprocal position of the walls occur according to an exciting signal transmitted from a programmable integrated circuit. Heat emitters carry away excess heat from the system devices. Inside a single element there are provided interlocks for connecting to other single elements, as well as magnetic coils and a voltage source supplying the integrated circuit, interlocks, magnetic coils and electroplastic actuator.

DETAILED DESCRIPTION OF THE INVENTION

Figure 1:
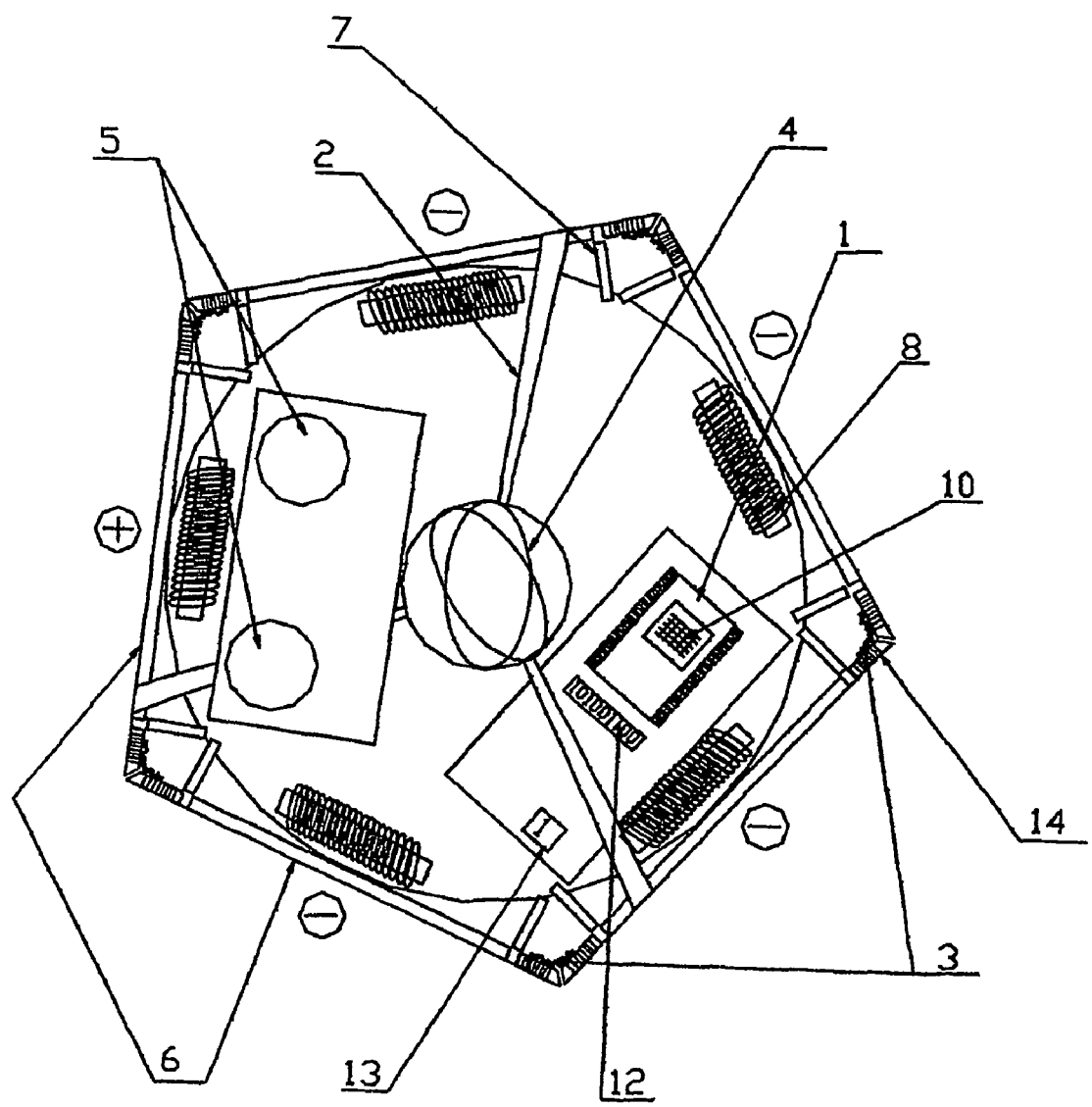
FIG. 1 illustrates, in two dimensions, the structure of an active element of the system.
Figure 2:
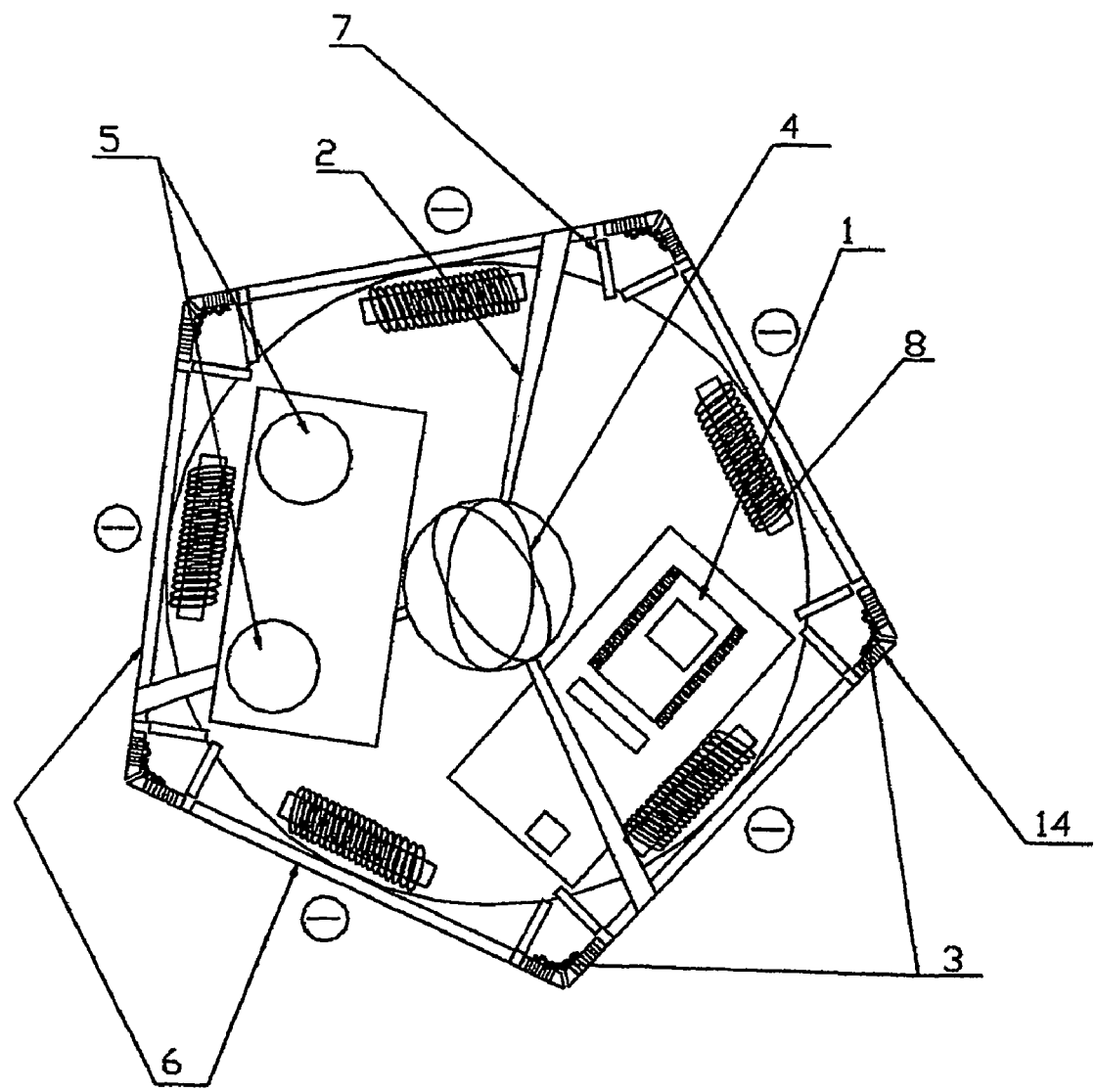
FIG. 2 illustrates, in two dimensions, the structure of an inactive single element of the system.
Figure 3:
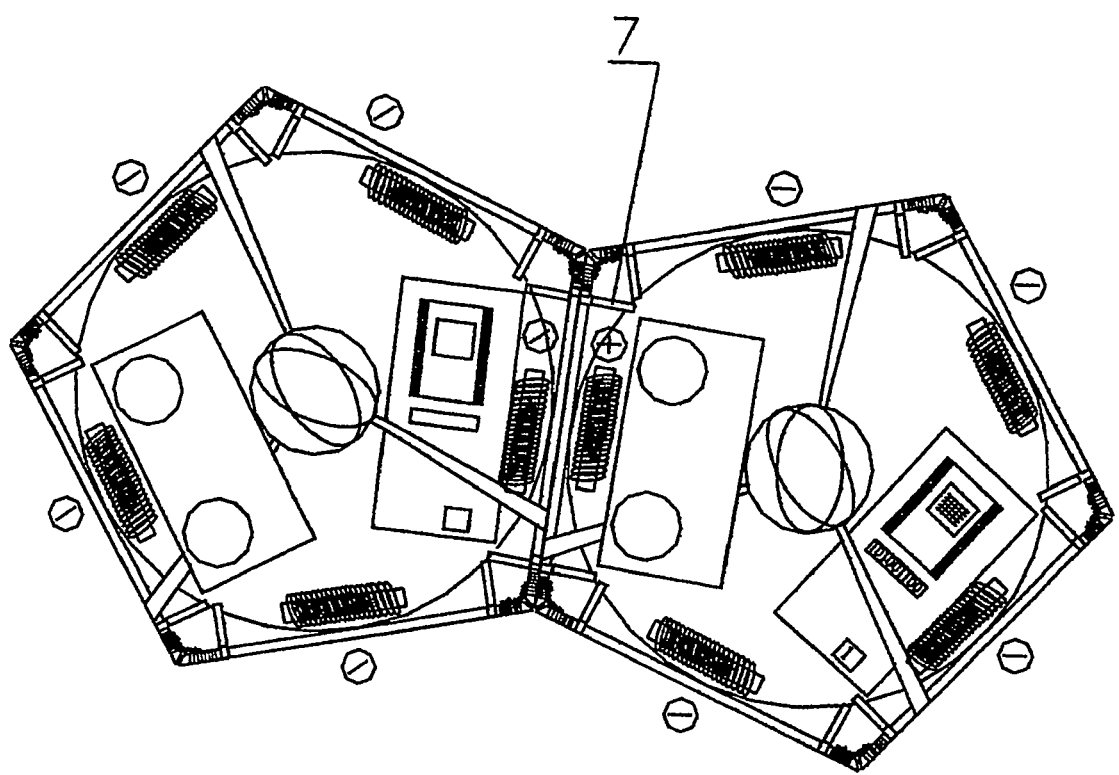
FIG. 3 illustrates, in two dimensions, the initial phase of connection of a active single element of the system with an inactive single element of the system.
Figure 4:
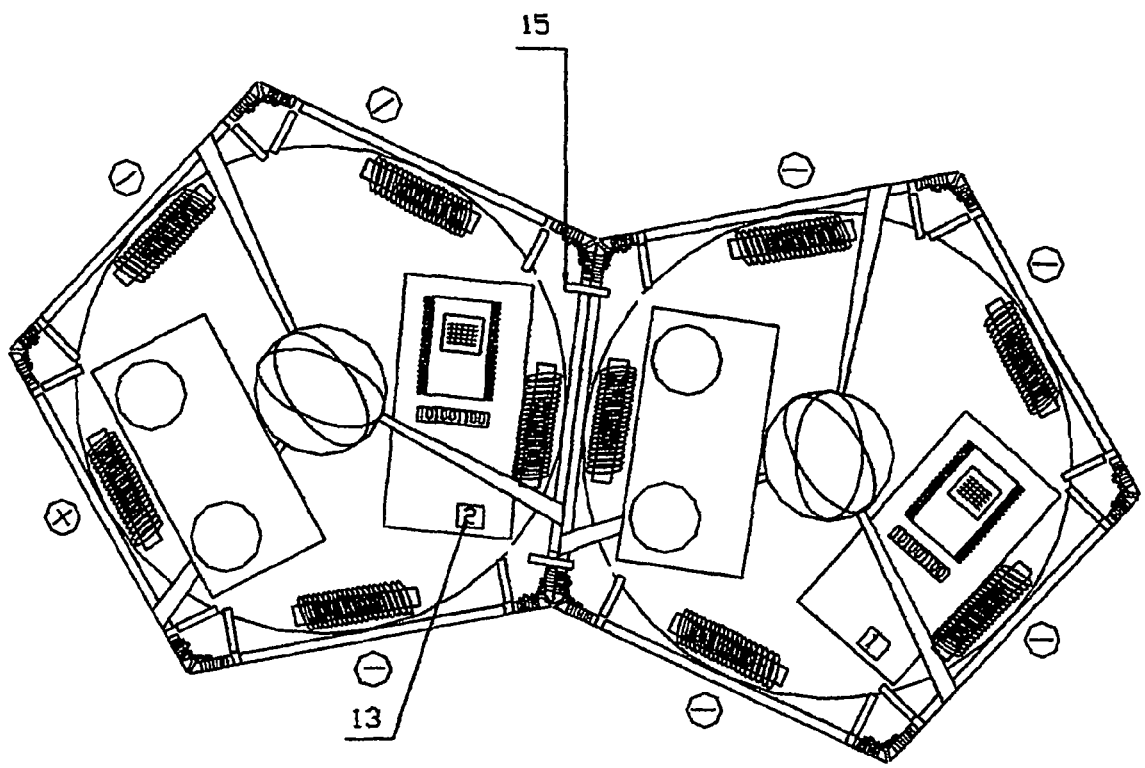
FIG. 4 illustrates, in two dimensions, the final phase of connection of an active single element of the system with an inactive single element of the system.
Figure 5:
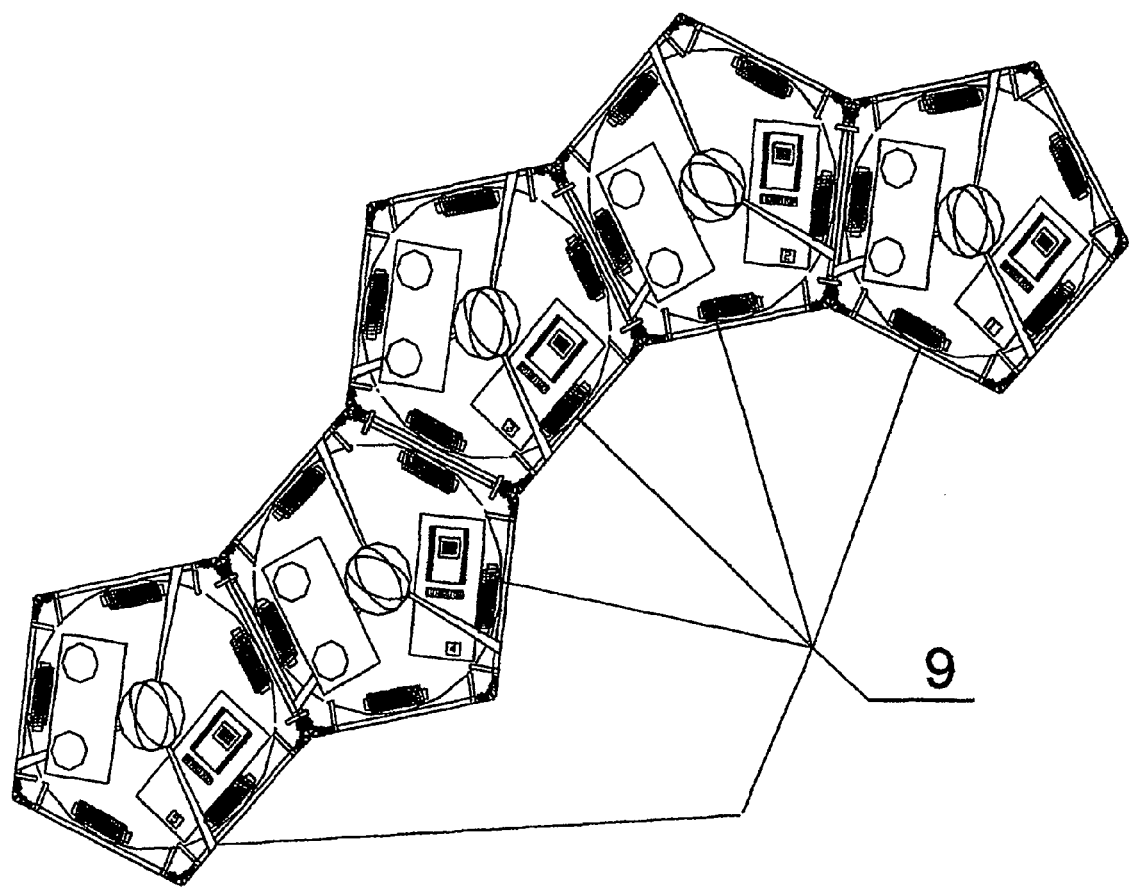
FIG. 5 illustrates, in two dimensions, a permanent connection of five single elements of the system to make an actual structure.

The invention comprises a system of three-dimensional multipurpose elements, consisting of single solid elements, which can translocate, connect one to and disconnect one from another. The single solid elements contain programmable integrated circuits, interlocks for linking respective single elements and electromagnets. The casing walls of a single element of the system have magnetic polarisation depending on the programmed position of the single element in the actual structure under formation. In the active state of a single element, the walls of the casing of a single element of the system have different magnetic polarisation, whereas in the inactive state of a single element, the walls of the casing of a single element of the system have identical magnetic polarisation.

Upon connecting an active single element of the system to an inactive single element of the system, information about the desired structure under formation (also referred to as the "virtual object" or "virtual structure") and information about the number that that particular inactive single element represents in the actual structure built thus far (referred to hereinafter as the "running number") is transmitted from the active single element of the system to the memory of the integrated circuit of the inactive single element of the system. For example, a particular inactive single element might be the one hundredth single element successively connected up to that point in a structure which will eventually contain six hundred single elements connected together. Sets of co-ordinates of the walls of the casing of a given single element of the system are assigned to the running numbers of single elements of the system. The sets of those data are transferred to the program in the integrated circuit of each single element of the system, while the program in the integrated circuit decides whether to activate or deactivate the various other walls of single elements of the system, and assigns the appropriate running number to the next single element of the system to be linked successively.

Magnetic polarisation in the walls of the casing of a single element of the system is generated by electromagnets placed inside a single element of the system. The walls of the casing of a single element of the system are connected to each other so that their reciprocal position can be changed. The walls of the casing of a single element of the system are connected with each other by means of electroplastic actuators, which control the reciprocal positioning of the walls according to the exciting signals transmitted from the programmable integrated circuit.

A single element of the system has a voltage source supplying the integrated circuit, interlocks, electromagnets and electroplastic actuators. The voltage source is renewable due to supply from solar batteries. The light to the solar batteries is carried in light pipes which also carry both information on the object and program instructions to the integrated circuit.

The object being constructed may be disassembled, to the initial state of single elements of the system, through deactivation of all casing walls of single system elements and disconnection of all interlocks in consequence of transmitting information to the integrated circuit.

The system enables a multiple use of the same single elements of the system for making new structures having destroyed first the previous structure. Each of the single elements of the system has got a set of information necessary for reconstructing an actual structure. From any quantity of single elements of the system one can create structures and constructions, designed according to one's wish, and having a vast range of forms, colours and materials, mechanical, kinematics, material and dynamic properties.

A detailed description of a preferred embodiment of the invention, including references to the relevant part numbers shown in the drawings, follows:

A single element of the system of three-dimensional multipurpose elements consists of a casing made up of walls 6 linked to each other by means of electroplastic actuators 3 which can change the reciprocal position of the walls 6 of the casing of a single element of the system of three-dimensional multipurpose elements through tensioning or slackening. Changes in the reciprocal position of the walls 6 occur according to the exciting signal transmitted from a programmable integrated circuit 1. Heat emitters 14 carry away both excess heat generated in the process of changes of reciprocal position of the walls 6 of the casing of a single element and the heat from other system devices. Inside a single element there are provided interlocks 7 for connecting respective single elements, magnetic coils 8 and a voltage DC source 5 supplying the integrated circuit 1, interlocks 7, magnetic coils 8 and electroplastic actuators 3.

The voltage source 5 is renewable due to supply from solar batteries 4. The light to the solar batteries is carried in light pipes 2, which also carry both information on the object 10 and program instructions 12 to the integrated circuit 1.

Figure 6:
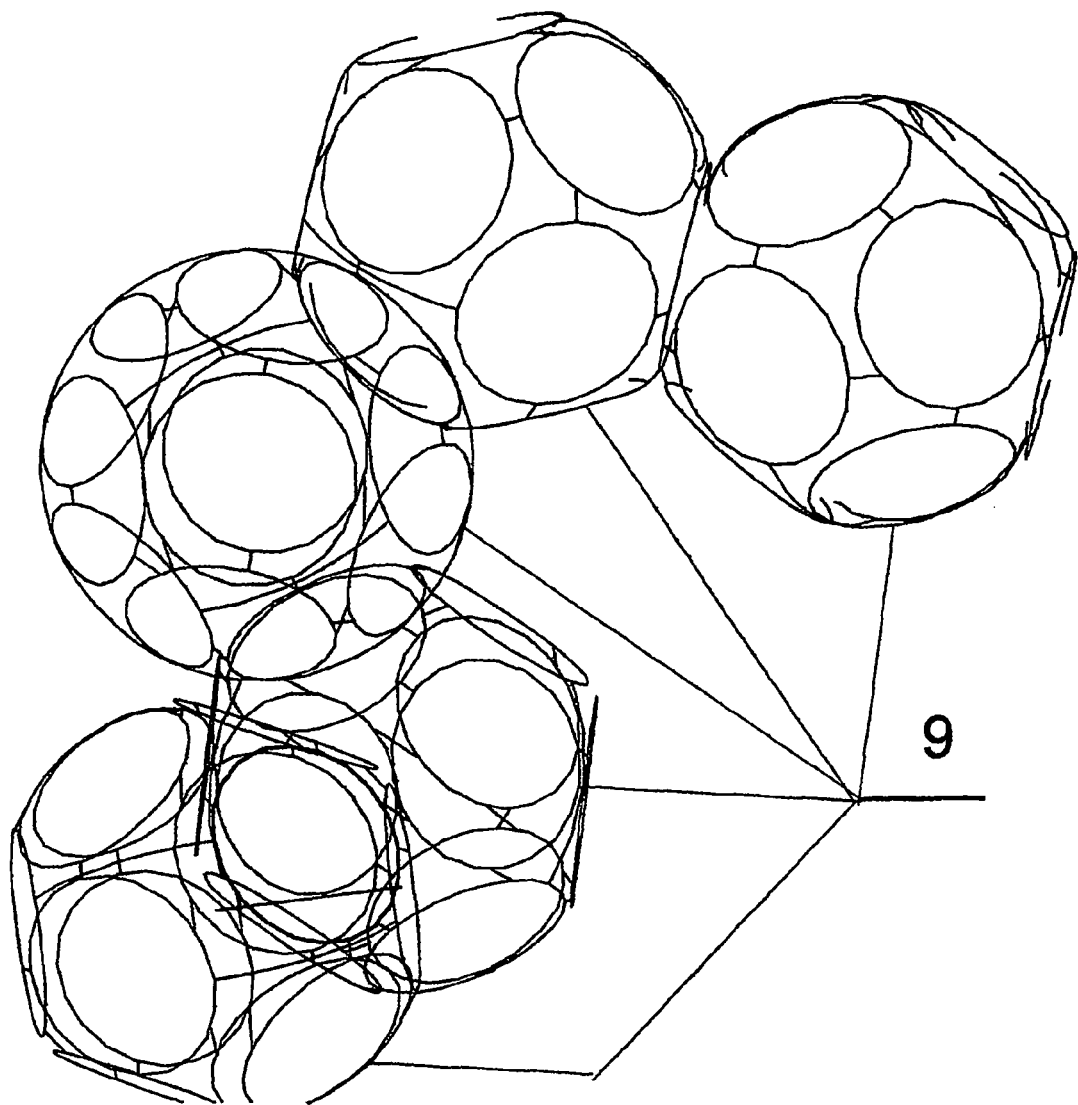
FIG. 6 illustrates, in three dimensions, an actual structure made up of five single elements of the system.
Figure 7:
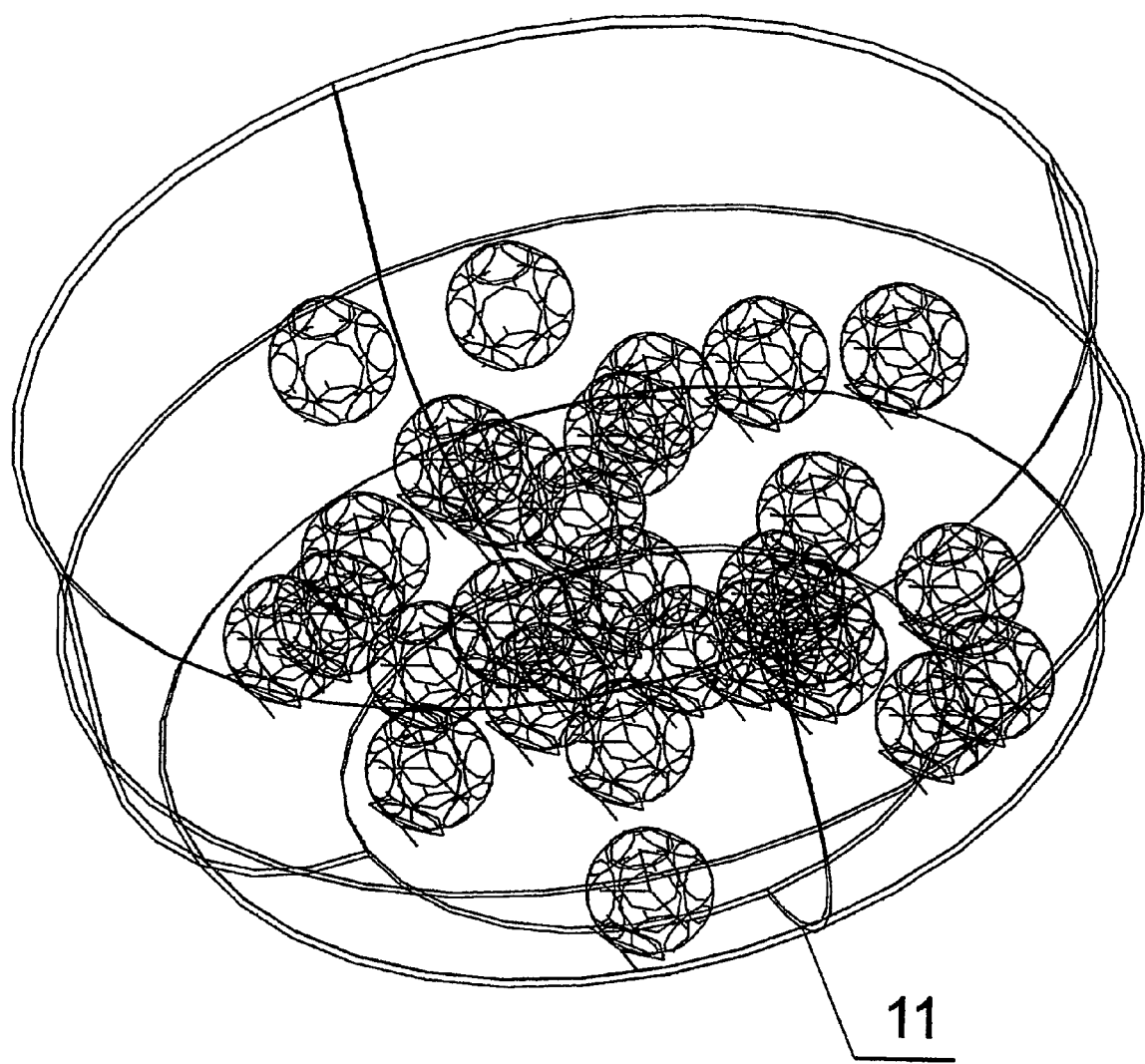
FIG. 7 shows a simplified view of a mobile container with single elements of the system placed in it.

In the inactive state, the single element of the system of three-dimensional multipurpose elements has all walls 6 of the casing polarised with identical [negative or positive] magnetic poles. In the active state, the respective walls 6 of the casing of a single element may be polarised with different magnetic poles. Polarisation of the respective walls 6 of the casing of a single element of the system depends on the position of the given element of the system in the actual structure under creation 9 according to the virtual structure of the object 10 programmed in the integrated circuit 1. The set of inactive single elements of identical magnetic polarity, placed in the container 11 [FIG. 7], is subject to a constant controlled motion. As soon as an active single element of the system is introduced into the set of single inactive elements of the system, the nearest inactive element of the system is connected to the active element of the system. The first active single element of the system has the initial number 13 of the virtual structure of the object 10, marked 1, and corresponds to the same number in the actual structure 9 under creation (FIG. 6). Upon connecting an active single element of the system to an inactive single element of the system, both information on the virtual object 10 being constructed and information on the successive running number 13 that the inactive single element being connected represents in the actual structure 9 is transmitted from an active single element of the system to the memory of the integrated circuit 1 of the inactive single element of the system, while sets of co-ordinates of the walls 6 of the casing of a given single element of the system are assigned to the running numbers 13 of single elements of the system. The sets of those data are transferred to the program 12 in the integrated circuit 1 of each single element of the system. According to the data transmitted regarding the virtual object 10, the program 12 in the integrated circuit 1 decides whether to activate or deactivate the various other walls 6 of single elements of the system, and assigns an appropriate running number 13 for the next single element of the system to be linked successively. When the successive single element of the system is linked to the prior single element of the system the connection is locked by means of interlocks 7 of any type. The procedure of linking and activating successive single elements of the system and making the actual structure of the object 9 continues until all single elements of the system, within the range of all running numbers 13, available in the virtual object 10 in the integrated circuit 1 are connected. When all connections between single elements of the system are completed, an actual structure 9 is created which matches the virtual object 10. The actual structure 9 of the object can be disassembled to the initial state of the single elements of the system, namely to a loose initial set of inactive single elements of the system. This occurs through deactivation of all walls 6 of the casings of single elements of the system and disconnection of all interlocks 7 in consequence of having transferred appropriate information to all integrated circuits 1 of the real structure 9. After such a deactivation, all single elements of the system of three-dimensional multipurpose elements may be re-used for making a new three-dimensional structure for any purpose desired.

The invention claimed is:

1. A system of three-dimensional multipurpose elements, comprising:

a) a plurality of single solid elements which can move, connect to one another, and disconnect from one another depending on their reciprocal positions, said single solid elements containing programmable integrated circuits, interlocks and electromagnets, b) each said single solid element having a plurality of planar casing walls, each said planar casing wall having variable magnetic polarisation, and wherein the reciprocal position of said single solid elements is a result of a change in magnetic polarization of said planar casing walls, said change being accomplished by activation or inactivation of said single solid elements, c) each said single solid element having a voltage source inside, d) each said single solid element containing programmed instructions that contain information about a desired object to be constructed and about a successive running number that an inactive single solid element being connected represents in an actual object being constructed, said programmed instructions being transmitted from the programmable integrated circuit of an active single solid element to the programmable integrated circuit of the inactive single solid element, and e) said programmable integrated circuits being adapted to decide whether to activate or deactivate said planar casing walls of said single solid elements, and which said planar casing walls of said single solid elements to activate or deactivate, so that said single solid elements are linked together successively.

2. The system according to claim 1, wherein the planar casing walls contained in each said single solid element are connected to each other so that their reciprocal position can be changed.

3. The system according to claim 1, wherein the planar casing walls contained in each said single solid element are connected to each other by an electroplastic actuator which is connected to the programmable integrated circuit.

4. The system according to claim 1, wherein the voltage source is a renewable source.

5. The system according to claim 4, wherein the renewable voltage source is renewable due to supply from solar batteries.

6. The system according to claim 5, wherein a light provided to the solar batteries is carried in light pipes.

7. A system according to claim 6, wherein the light pipes (2) are operatively connected to the integrated circuit (1) in order to carry to the integrated circuit (1) both information on the object (10) and program instructions (12).

8. A system according to claim 1, characteristic thereof being that to running numbers (13) are assigned sets of co-ordinates of the walls (6) of single elements of the system, whereas the assigned sets of coordinates are transferred to the program (12) in the integrated circuit (1) of each single element of the system.

9. A system according to claim 1, characteristic thereof being that an actual structure (9) of the desired object may be dissipated to an initial state of single elements of the system through deactivation of all casing walls (6) of single system elements and disconnection of all interlocks (7) in consequence of having transmitted appropriate information to the integrated circuit (1).

10. A method for creating three-dimensional constructions, comprising the steps of:

a) connecting and disconnecting three-dimensional single multipurpose elements depending on their reciprocal positions, wherein said single multipurpose elements have casing walls with variable magnetic polarisation and wherein the reciprocal position of said single multipurpose elements is the result of a change in electromagnetic polarisation of said casing walls, said change being accomplished by activation or inactivation of said single multipurpose elements, b) transmitting, from an active single multipurpose element to the memory of an integrated circuit contained in an inactive single multipurpose element, information about a desired object to be constructed and about the successive running number that the inactive single multipurpose element being connected represents in the actual object constructed thus far, and c) deciding, by the integrated circuit, whether to activate or deactivate said casing walls of said single multipurpose elements so that said single multipurpose elements are linked together successively.

* * * * *